(12) United States Patent
Odiaka

(10) Patent No.: US 6,829,347 B1
(45) Date of Patent: Dec. 7, 2004

(54) CONSTRAINT BASED ROUTING

(75) Inventor: Sam Odiaka, London (GB)

(73) Assignee: Nortel Networks Limited, St. Laurent (CA)

( * ) Notice: Subject to any disclaimer, the term of this patent is extended or adjusted under 35 U.S.C. 154(b) by 495 days.

(21) Appl. No.: 10/020,457

(22) Filed: Dec. 14, 2001

(51) Int. Cl.[7] .............................................. H04M 7/00
(52) U.S. Cl. ........................... 379/220.01; 379/114.02; 379/221.01; 379/221.06; 379/221.07
(58) Field of Search ....................... 379/112.05, 112.06, 379/114.02, 219, 220.01, 221.01, 221.06, 221.07

(56) References Cited

U.S. PATENT DOCUMENTS

| | | | | |
|---|---|---|---|---|
| 4,284,852 A | * | 8/1981 | Szybicki et al. ........ | 379/221.01 |
| 4,991,204 A | * | 2/1991 | Yamamoto et al. ..... | 379/221.01 |
| 5,142,570 A | * | 8/1992 | Chaudhary et al. .... | 379/221.07 |
| 5,406,620 A | * | 4/1995 | Pei ......................... | 379/221.02 |
| 5,481,604 A | * | 1/1996 | Minot .................... | 379/114.01 |
| 5,978,730 A | * | 11/1999 | Poppen et al. .............. | 701/202 |
| 6,023,501 A | * | 2/2000 | Wakamatsu ............ | 379/114.02 |
| 6,366,576 B1 | * | 4/2002 | Haga .......................... | 370/352 |
| 6,404,864 B1 | * | 6/2002 | Evslin et al. .......... | 379/112.01 |

OTHER PUBLICATIONS

Giulio Barberis and Umberto Mazzei, Ashortest route algorithm for graphs having weighted nodes and arcs with application to S/F communication network, Mar. 1977, pp. 63–66.*

* cited by examiner

Primary Examiner—Bing Q. Bui
(74) Attorney, Agent, or Firm—Barnes & Thornburg

(57) ABSTRACT

A method of selecting a trail using a Constraint based routing technique in which at least one user-determined routing policy is used to bias input to a Dijkstra/Yen-K shortest path routing engine, so as to limit output by the routine engine to routes conforming with the user-determined routing policy.

17 Claims, 9 Drawing Sheets

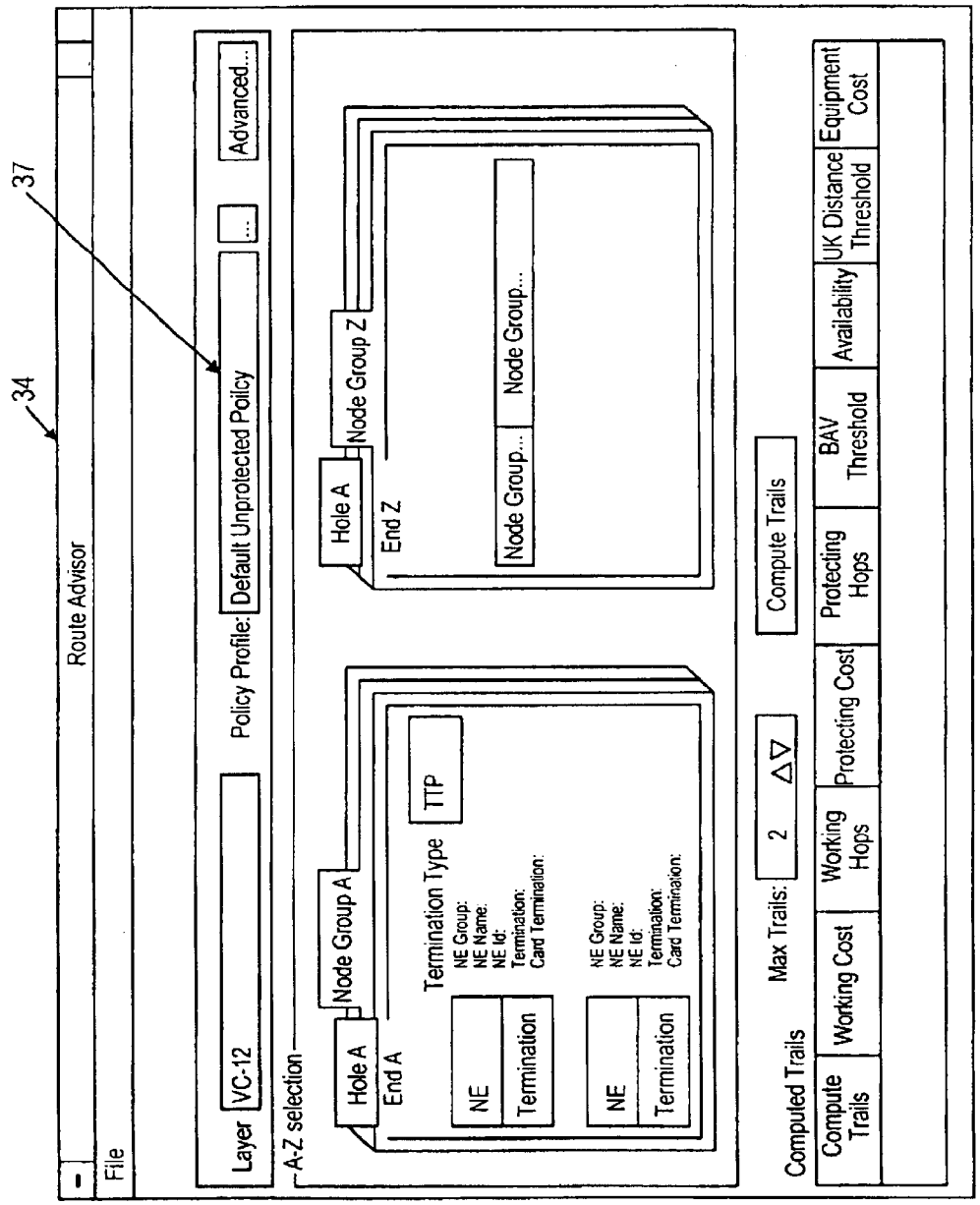
*Fig. 2* Route Advisor Trail Criteria Dialog

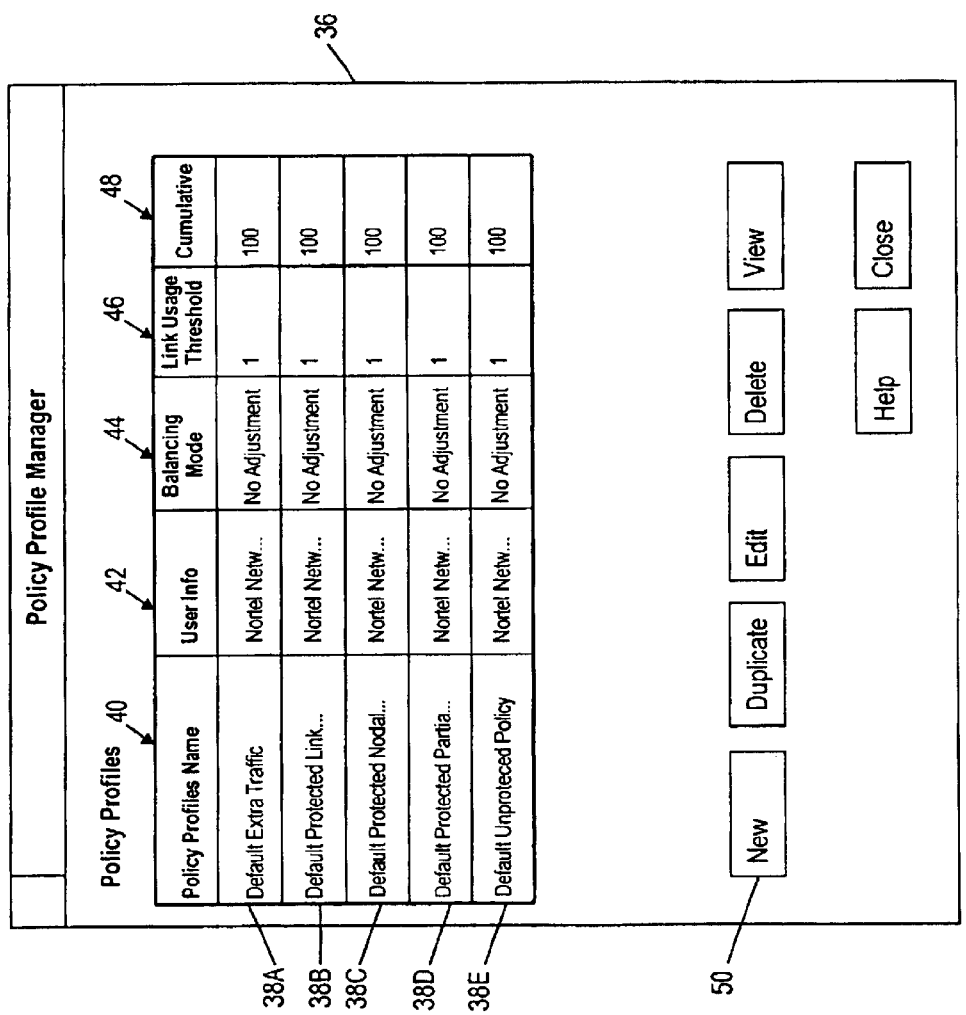

Fig. 3B

CONSTRAINT BASED ROUTING

FIELD OF THE INVENTION

The present invention relates to a constraint based routing scheme for a network, particularly but not exclusive to a routing scheme which adopts various constraint profiles which can be selected by a user and implemented by a network operator for a communications network.

BACKGROUND TO THE INVENTION

Within the physical resources of a network, for example, within a network element, circuit switched traffic can follow paths and trails at various multiplex levels. A trail, for example, may be a circuit, line, path or section into which, at a first end, is inserted a data stream, and at a second end, is output the data stream.

Routing traffic across a network is becoming an increasingly complex task often requiring both manual and computational techniques to be combined. Computed routes may include network elements paths which are suitable for a variety of reasons. For example, whilst a network may support a variety of traffic types, however not all network elements may support a specific traffic type. If this route is to be used, then a container is needed to carry such traffic over the route between those network elements. Alternatively, those network elements must be avoided and another route needs to be selected.

For example, within a communications network, there may be a restricted number of network elements which are capable of processing voice data. Operations on voice data at a voice level may be performed within those particular network elements. However, to transport traffic data between those network elements, there must be further transmission, such as provided by a synchronous digital hierarchy (SDH) virtual container system.

As an example, if a voice connection is to be made between two geographically disparate network elements, the connection may be routed via intermediate network elements in the VC-12 layer. However, the VC-12 layer itself, to connect between intermediate network elements, may need to be multiplexed into a higher bit rate layer, e.g. the VC-4 layer.

Conventional trail routing schemes compute a number of potential routes and return these as potential routes to the network operator. The network operator must then select from the returned routes a suitable route bearing in mind any requests made by a user and the type of traffic to be routed. Trails computed conventionally will often include connections which are either physically and/or logically unsuitable. Conventional trail routing programs do not efficiently incorporate user preferences and/or desired routing profiles into the computation of the routes to eliminate the majority of unsuitable routes unless they are based on complex, for example genetic, algorithms. Such complex algorithms can incur extensive coding and, despite their complexity, often demonstrate a lack of versatility which creates implementation problems.

Conventional routing programs often implement Dijkstra algorithm based route selection scheme(s). These are more simple to implement in code than a genetic algorithm based route selection scheme. However, a problem associated with use of the Dijkstra algorithm is the high number of potential routes it returns from analysis at the abstract level which must then be confirmed as acceptable at the physical level either automatically or by a human operator intervening in the process.

The number of unsuitable routes selected in conventional Dijkstra based selection schemes can be extremely high, for example, in an optical network, Dijkstra based routing schemes often require subsequent verification of over a hundred possible routes. The elimination of redundant routes is often a time consuming process.

Users of a communications network providing routing services often request that a routing policy be used when a trail is being established. For example, when routing a trail consideration is often paid to criteria such as whether the trail will carry voice, data, video or graphics services, and the extent to which the trail maximises network asset utilization and minimises blocking. Accordingly, there is a demand for a network management system which can mediate between a required class of service requested by a user and the available quality of service which can be supported.

OBJECT OF THE INVENTION

One object of the invention seeks to mitigate and/or obviate the above problems by providing a method of selecting a trail route which is able to support and enforce user selected policies independently of the treatment of each class of traffic within different networking scenarios.

Another object of the invention is to provide an route advising application which provides routing policy management, i.e., routing management which can be selectively based on one or more predetermined routing profiles or equivalently routing principles. Such routing profiles may be based on criteria such as, for example, a balancing mode criteria for balancing traffic across the network, a threshold level for link usage criteria, a cumulative path threshold level criteria, a diverse routing criteria, an exclusion profile criteria for excluding some network sector/traffic type, a Quality of Service criteria, a Class of Service criteria, and/or a User Information criteria. A profile formed from an appropriate combination of these criteria can then be used in route computation requests.

Another object of the invention thus seeks to provide a method of optimising a routing scheme for a network.

Another object of the invention seeks to provide a routing scheme for a network which enables a suitable route to be determined automatically by pre-weighting certain routes according to their likely appropriateness.

The routing scheme according to the invention enables a route to be preselected using the routing algorithm which reflects additional selection criteria than simply the shortest-path across a network, for example, a route can be preselected to balance load on the network more evenly. Moreover, only routes which are physically able to support a particular connection request can be selected. Other selection criteria such as the cost of a route may be incorporated into the routing scheme to influence route selection by the Dijkstra algorithm.

The pre-weighting is provided by modifying the weight given to a network link in a conventional routing algorithm such as a Dijkstra algorithm. This biasing of a conventional routing algorithm enables factors beyond simple topology to be taken into account.

SUMMARY OF THE INVENTION

A first aspect of the invention seeks to provide a method of selecting a trail route across a communications network using a routing engine, the method comprising the steps of: selecting a routing policy profile having at least one route biasing parameter; inputting information from said routing policy profile to said routing engine, in which said information includes information derived from said selected at least one route biasing parameter which biases the computation of trail routes; and computing a set of potential trail routes containing at least one potential trail route whose selection has been biased in accordance with said selected routing policy.

Preferably, the method is used to select trail routes for different classes of traffic within a network. The routing policy may bias the output of the routing engine independently of the manner in which said different classes of traffic are individually routed.

The step of selecting a routing policy profile may be performed by a user of the communications network, or by a network operator, or be performed automatically.

Preferably, at least one of said parameters is taken from the group consisting of:

a balancing mode criteria; a threshold level for link usage criteria; a cumulative path threshold level criteria; a diverse routing criteria; an exclusion profile criteria for excluding some network sector/traffic type; a Quality of Service criteria; a Class of Service criteria; and a User Information criteria.

Preferably, the routing engine comprises a Dijkstra algorithm.

The trail route selected may provide protection for a working path.

Preferably, if the trail route selected provides protection for a working path, the trail route selected may re-use at least one link along the working path having a higher capacity than any other available link.

A second aspect of the invention seeks to provide a routing application having a graphically displayed user interface arranged to enable the selection of a trail route across a communications network using a routing engine, the software comprising: selection means for a network operator of a communications network to select a routing policy profile having a plurality of parameters; input means to input information from said routing policy profile to said routing engine to bias the computation of trail routes; and computational means to compute a set of potential trail routes containing at least one potential trail route whose selection has been biased in accordance with said selected routing policy.

A third aspect of the invention seeks to provide a constraint based routing scheme for a communications network, the scheme comprising a method of selecting a trail route across a communications network using a routing engine, the method comprising the steps of: selecting a routing policy profile having a plurality of route constraining parameters which are capable of constraining the output of said routing engine; inputting information from said routing policy profile to said routing engine, wherein said inputted information includes said route constraining parameters to bias the computation of trail routes; and computing a set of potential trail routes containing at least one potential trail route whose selection has been biased in accordance with said selected routing policy information by the inputted route constraining parameters.

A fourth aspect of the invention seeks to provide apparatus arranged to implement a method of selecting a trail route across a communications network using a routing engine, the apparatus comprising: selection means arranged to enable a network operator to select a routing policy profile having a plurality of parameters; input means arranged to input information from said routing policy profile to said routing engine to bias the computation of trail routes; and computational means arranged to compute a set of potential trail routes containing at least one potential trail route whose selection has been biased in accordance with said selected routing policy.

A fifth aspect of the invention seeks to provide a route advising application providing routing policy management which can be selectively based on one or more routing policies, the routing policies having route biasing parameters which bias input into a Dijkstra based routing engine to constrain the number of routes output by the Dijkstra based routing engine to a set of at least one route which conforms with said routing policy.

Preferably, the said one or more routing profiles may be based on at least one criteria taken from the group consisting of: a balancing mode criteria for balancing traffic across the network, a threshold level for link usage criteria, a cumulative path threshold level criteria, a diverse routing criteria, an exclusion profile criteria for excluding some network sector/traffic type, a Quality of Service criteria, a Class of Service criteria, and/or a User Information criteria.

A sixth aspect of the invention seeks to provide a routing scheme for a network comprising:

applying a biasing factor to a network link in a network topology model;

providing input from said biased network topology model to a routing algorithm;

selecting a route from a subset of at least one potential routes generated by said routing algorithm.

Preferably, said biasing factor is a weight given to said network link to prejudice said muting algorithm from selecting said network link More than one network link, which is a connection between two network nodes, or network elements, may be biased.

A seventh aspect of the invention include providing apparatus arranged to implement a routing scheme for traffic over a communications network according to the sixth aspect. An eighth aspect of the invention seeks to provide a system for routing traffic over a communications network, the system comprising apparatus arranged to implement the routing scheme according to the sixth aspect.

Advantageously, the invention enables customer specified trail routing policies took be supported.

Advantageously, by modifying a conventional Dijkstra based route selection schemes to incorporate additional selection criteria to eliminate the selection of unsuitable routes, a limited set of routes may be returned by the computational process, eliminating the need for extensive further review for physical/logical compatibility.

The invention is also directed to a method by which the described apparatus operates and including method steps for carrying out every function of the apparatus.

The invention also provides for a system for the purposes of digital signal processing which comprises one or more instances of apparatus embodying the present invention, together with other additional apparatus.

The preferred features may be combined as appropriate, as would be apparent to a skilled person, and may be combined with any of the aspects of the invention.

It is advantageous if an algorithm can be utilised which requires less time to implement and which enables a more rapid selection of a suitable route by a network operator.

In particular, in order to maintain the overall efficiency of a communications network, it is often desirable to route calls across the network in a manner which balances out the load on the network. Moreover, where protection needs to be provisioned in a network, it necessary to identify rapidly from the route(s) determined at an abstract network topology level as potentially suitable, a route or subset of routes having the required physical characteristics to support the connection.

BRIEF DESCRIPTION OF THE DRAWINGS

In order to show how the invention may be carried into effect, embodiments of the invention are now described below by way of example only and with reference to the accompanying figures in which:

FIG. 2 shows schematically key screen features in a route advisor application GUI according to an embodiment the invention;

FIG. 3A shows a policy profile manager GUI for use in a route advisor application according to an embodiment of the invention;

FIG. 3B shows a policy profile editor GUI for use in a route advisor application according to an embodiment of the invention;

DETAILED DESCRIPTION OF INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

The invention extends over any network of physical and logical resources in the telecommunications or computer networks domains, having a management information system. Networks operating asynchronous transfer mode (ATM), synchronous optical network (SONET), integrated service digital network (ISDN) and SDH are specific examples of such networks. However, the invention is not restricted to networks operating these specific protocols.

Figure 1:
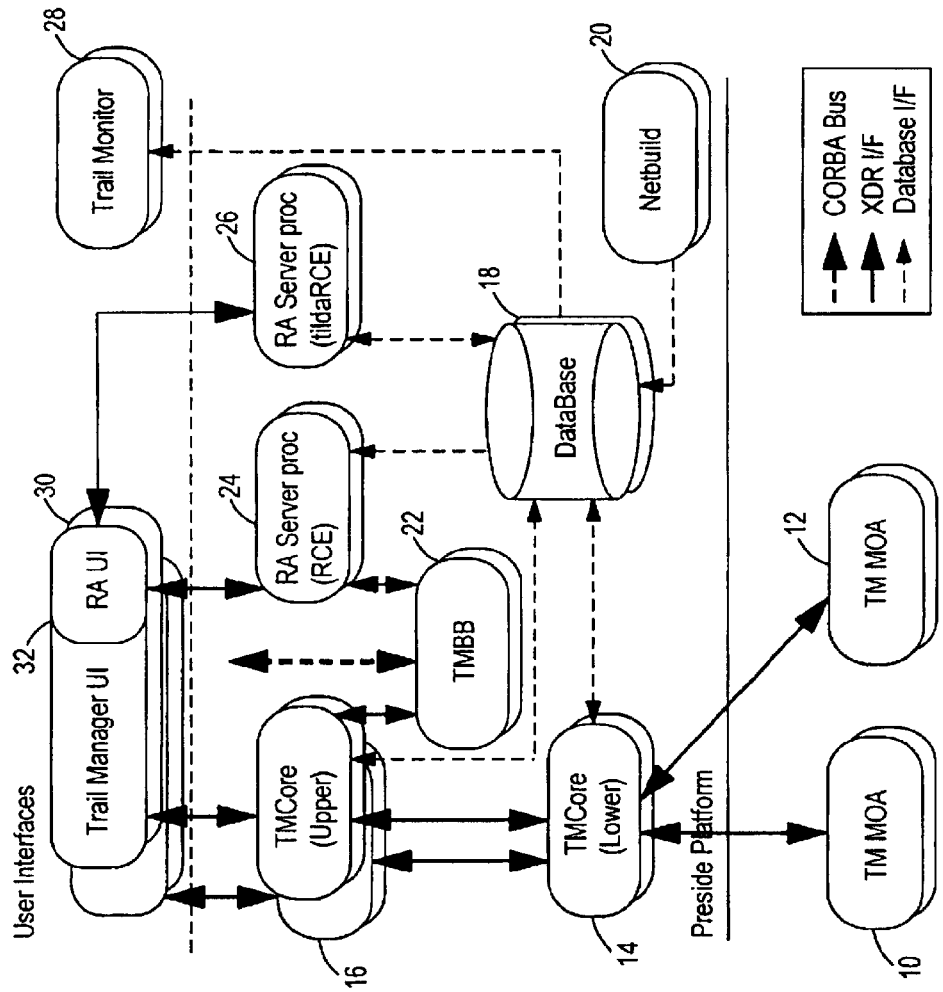
FIG. 1 shows schematically an example of a trail manager application which can Incorporate a routing application according to an embodiment the invention.

A first embodiment of the invention will now be described with reference to FIG. 1 of the accompanying drawings. FIG. 1 shows schematically the architecture of a trail management application such as may be used by a network operator to generate trails across a communications network, for example, in response to a request received from a user of a network. The trail management software application shown in FIG. 1 comprises a platform supported by managed object agents 10, 12. The managed object agents 10,12 communicate with lower core application 14, which in turn communicates with upper core application 16. The core applications 14, 16 interface with a main managed object database 18. Relevant information on network elements is stored in database 18 in an abstracted form which enables specific information to be extracted according to a number of criteria, for example, in response to a routing request.

Database 18 interfaces with route advisor servers 24, 26 which in turn interface with a route advisor user interface 32 provided within a general trail manager user interface 30. The general user interface 30 also interacts with a trail manager building block type application TMBB 22. The TMBB application enables the network operator to create and delete trails. Netbuild tool 20 provides input to the database 18 which in turn supplies input to trail monitor 28. The netbuild tool 20 is an off-line tool used to add and/or remove physical connectivity between nodes, cut in nodes where a connectivity exists between nodes, and add trails to the database. Trail Monitor 28 is an off-line tool used to collect network statistics data, for example, the number of nodes, endpoints, trails, at a particular instance.

The route advisor applications drive the route computing engines by providing information from the trail manager application about real-world constraints, for example, constraints such as maximum number of hops etc. The route advisors modify the trail manager information to ensure that the route computing engine receives an appropriate view of the real-world constraints requested to ensure that the route computing engine, i.e., the Dijkstra route computation algorithm selects paths optimised to conform with the real-world constraints. The route advisors are limited to providing localised knowledge, and as such generally effect only localised modifications to the trail. The information supplied regarding requested constraints is not binding on the routing engine, and it is still possible for more costly paths to be selected. Thus the route advisors are able to provide a local view input to the route selection engine which generally considers only the global view.

In a preferred embodiment of the invention, a user of the trail management software is presented with the main user interface 30 from which the route advisor interface 32 is accessed. Selection of the route advisor interface 32 by the user opens the route advisor trail criteria dialog screen 34 shown in FIG. 2, from which selection of a routing policy profile screen 36 is possible via menu 37.

FIG. 3A shows the policy profile manager screen 36 in which a plurality of default policy profiles 38a, . . . e are displayed which can be selected by the user. Each default policy profile 38a, . . . , e is associated with a number of parameters, for example, a policy profile name 40, user information 42, balancing mode 44, link usage threshold 46, cumulative link usage threshold 48, . . . etc. When computing a new trail, an operator must decide on which policy profile the route computation will use, and if the policy service type is not defined in a Policy profile, then the operator can defined a new policy profile by launching the policy profile editor screen 52 via menu item 50.

A user is then presented with a policy profile editor screen 52 (FIG. 3B), from which the various parameters comprising a policy profile can be selected and configured.

Figure 3B:
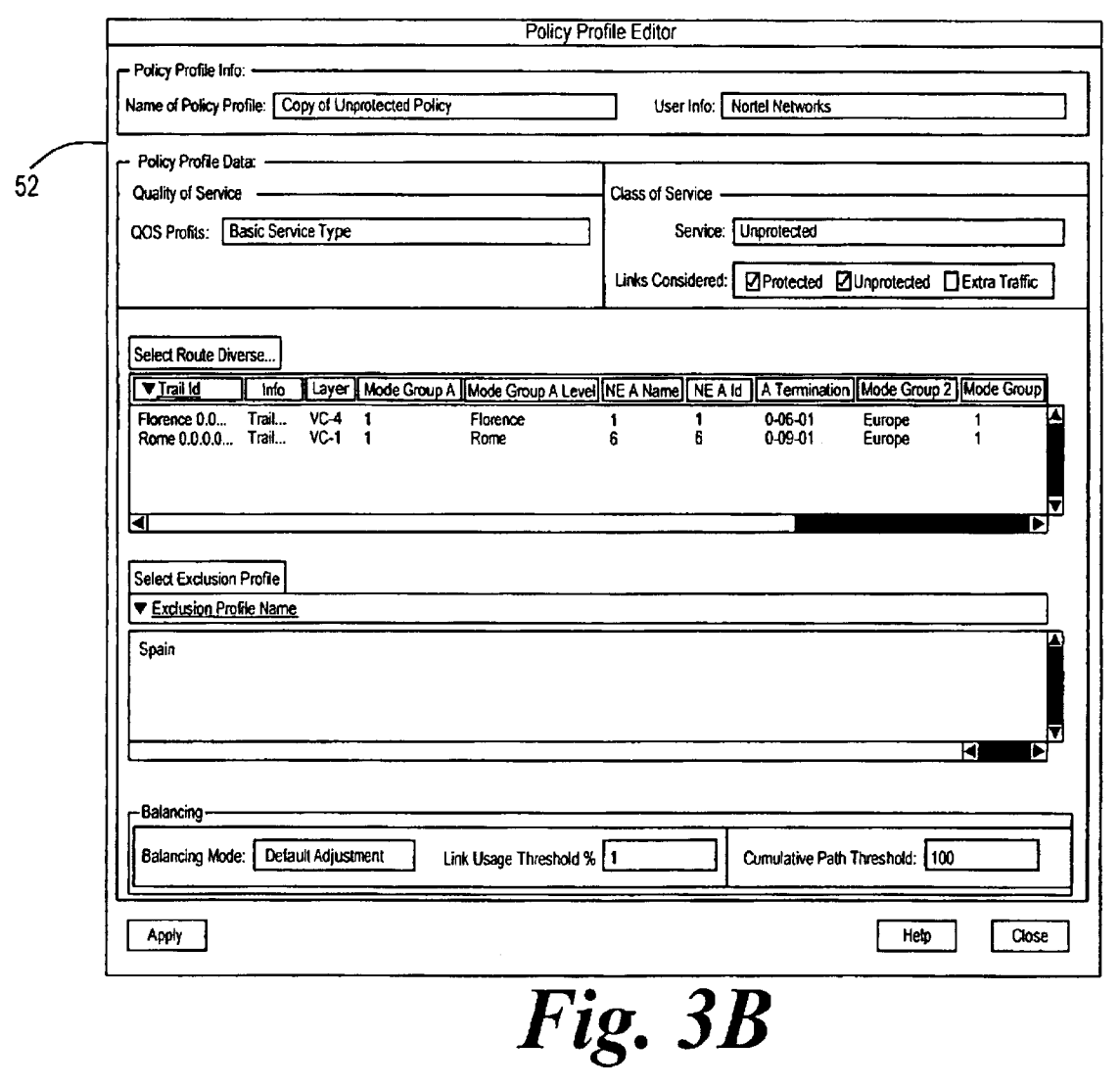

Thus in FIG. 3A the screen 36 provides a suitable display of features in a policy profile manager application for use in a route advisor network management application. FIG. 3B shows a policy profile editor screen 52 for use in a policy profile manager application such as that shown in FIG. 3A.

The policy profile for each service type specified (i.e. created or selected) is stored in the database 18 of the trail manager application (see FIG. 1). The policy profile can be specified by a network operator using the route advisor user interface 32 of the trail manager application. In this way, a policy profile can be specified by the network operator for every service type in their network using the visual displays of FIGS. 3A and/or 3B.

In practice, an operator of the trail manager application, which/who may be an automated/or non-automated network operator, seeking to compute a new trail first selects a policy profile for use in the route computation. If a suitable policy service type is not predefined in the policy profile, the operator is able to create a suitable profile using the policy profile manager (see FIG. 3A), and the policy profile editor (see FIG. 3B).

As an example, predefined class of service policy parameters profiles may include a default extra traffic policy value which uses only low and extra-low availability links; a default unprotected policy value which uses only high and low availability links; a default protected link diversity policy value which uses only high, low and extra-low availability links; a default protected partial diverse policy value which uses only high and low availability links; and a default protected nodal diverse policy which will use only high and low availability links.

Other potential default values for other policy profile parameters are shown below in table 1.

TABLE 1

Overview of Policy Profile Parameters.

| Data Fields | Expected Values | Default Values |
| --- | --- | --- |
| Link Usage Threshold Level | 1% to 100% | 1% |
| Balancing Mode | No-Adjustment Default-Adjustment User-Define-Adjustment | Default-Adjustment |
| Cumulative Path Threshold Level | 1 . . . 1000 | 100 |
| Diverse Routing | list_of_trails_ids | NULL |
| Exclusion Profile Lists | exc_profile_ids | NULL |
| Quality of Service profile | qos_profile_id | Basic Service Type |
| Class of Service profile | Extra Traffic, Unprotected, Protected Link Diverse, Protected Partially Diverse, Protected Nodal Diverse. | Unprotected |
| Class of Service Link Considered | Protected Unprotected Extra traffic | All links |
| User Info | String (As provided by a user.) | NULL |
| Policy Profile Name | String (Must be a unique name) | Basic Policy |

Table 1 shown above provides an overview of the routing policy profile parameters, their value ranges and default values. These parameters are described in more detail below:

Link Usage Threshold Level

This refers to the starting link usage level for adjusting the original link cost. In a preferred embodiment of the invention, a Fibonacci sequence is used to generate the values used to adjust the link cost. In alternative embodiments other suitable number sequences may be provided to ensure an appropriate scaling of cost values is generated. For example, if a Fibonacci sequence is used, then the adjustment values could be (2, 3, 5, 8, 13, 21, 34 etc.). Thus if the link usage is 40% (given as a percentage of total use), 2 is added to the cost of the link, if 50%, then 3 is added to the cost of the link, if 60%, then add 5, if 70% then add 8, 80% then add 13, 90% then add 21. The original cost in the described embodiments is assumed to be unity (i.e. 1). This policy parameter is described in more detail later herein below.

Balancing Mode

This parameter gives a user the ability to apply a balancing algorithm in the subsequent route computation. The operator can select to have: No-Adjustment or Default-Adjustment.

Cumulative Path Threshold Level

This parameter refers to the accumulation of links in the path (e.g. at a certain point in the route computation, if by choosing a certain link with least cost would mean going over the user defined "cumulative path threshold level" then the particular link(s) would not be considered in the route calculation.

Diverse Routing Lists

This parameter contains lists of trails id stored in the database for which any resources use in any of the trails listed should NOT be used in the subsequent route computation.

Exclusion Profile Lists

This parameter lists the exclusion profiles name stored in the database 18 (see FIG. 1) to be excluded from the route computation. Each profile, represents a collection of trails and/or nodes and/or hubs and/or sites which are not permitted to be used in subsequent route computation schemes.

QoS Profile

This parameter describes the quality of service for the trail. By default, only the basic service type selection is available. Additional QoS profile selections can be made available.

Class of Service

This parameter describes the service and link considered to be used the in the subsequent route computation requests. The service consists of "Extra Traffic", "Unprotected", "Protected Link Diverse", "Protected Partial Diverse"; and "Protected Nodal Diverse". Thus three link class of service parameters can be selected from when creating an additional traffic trail, namely, extra traffic, unprotected or protected, and it is possible to select any appropriate combination of links, for example, to use only links which have protected traffic and extra traffic designated as parameters under the class of service profile.

User Info

This parameter holds the additional user information, for example, such as the user name who created the policy.

Policy Profile Name

This parameter holds the name of the policy profile.

By selecting appropriate parameters from those described above, various profiles can be created for use as network management tools. The selection of an appropriate profile enables constraint based routing to be implemented in a cost-based routing engine, for example, a routing engine based on the Dijkstra and/or Yen K-Shortest path algorithms for determining possible routes for a trail. Such routing engines return a number of possible routes which have been computed for selection by the user, and are usually returned to the user in a least-cost order. As is known to those skilled in the art, the term 'cost' is to be interpreted as a 'quantitative' parameter indicating the suitability of the route and is not limited to a monetary value.

In order to determine possible routes for a trail at a particular client layer of the network, the characteristics of the immediate server layer network below are required (this is explained in more detail later herein below). The computation process for determining possible trail routes comprises two key steps:

the determination of potential routes in an initial non-validated condition (except for the originating and terminating nodes); and validation of the determined potential routes The route determination step generates a set of non-validated routes based on data describing the contemporaneous state of the immediate server layer network acquired by accessing the trail manager database. This is a database of managed objects and agents which contains data abstracted from the server layer network. The data will include information on (nodes whose use has not been precluded) which are connected by trails in the immediate server layer network (whose use has not been precluded by virtue of, for example, at least one of the following):

insufficient bandwidth to support the client layer trail;

unacceptable state an/or sub-state;

a going off-network;

presence and/or implication in the current trail/node exclusion profile; and one or both of the trail's terminating nodes present in the current trail/node exclusion profile).

Even if a trail is indicated as having free capacity, checking during the validation stage can indicate that some or all of this free capacity is not usable for the purposes of supporting the client layer trail.

As the non-validated routes are identified, they are passed on for validation. The validation step comprises checking to ensure that a) nodal connections are not violated and b) that usable capacity otherwise exists within the server layer network trails. Both criteria a) and b) must be satisfied before a non-validated route can be validated.

A non-validated route may consist of both working and protecting paths if a protected route has been requested. The protecting path is either fully, partially or link diverse from the working path as specified by the user. A partially diverse route is generated by excluding those trails used in the working path which have low availability when routing the protecting path. A link diverse route is generated simply by excluding those trails used in the working path when routing the protecting path. A fully diverse protected route is generated by excluding the trails/nodes which are used in the working path when routing the protection path.

A user is required generally to assign appropriate costs to trails; assign appropriate availabilities to trails; set up the current trail/node exclusion profile, and otherwise maintain trail/node exclusion profiles, appropriately when routing trails; and set up the current trail QoS profile, and otherwise maintain trail QoS profiles, appropriately when routing trails.

Prior to invoking the routing engine, the network operator is able to bias the algorithm using the second embodiment of the invention by using specific criteria such as the QoS profile, protection schema and/or node/trail exclusion profiles.

For example, the QoS profile comprises the following parameters: link distance; jitter; equipment cost; unavailability; and error ratio. Each parameter includes the following user attributes: cost weighting factor; equation; threshold. The operator sets the QoS parameters for each QoS profile.

Advantageously, the above embodiments of the invention provide a constraint based routing method employing user specified routing policies which:

i) enables maximum utilization of network assets (via efficient bandwidth utilization or load balancing of traffic across the network);

ii) minimizes blocking along inefficient routes; and iii) matches circuit routing to network planning recommendations.

Before the selection of these various parameters is described in more detail, an example of how an embodiment of the invention reduces the number of unsuitable trail routes computed is provided below.

Figure 4:
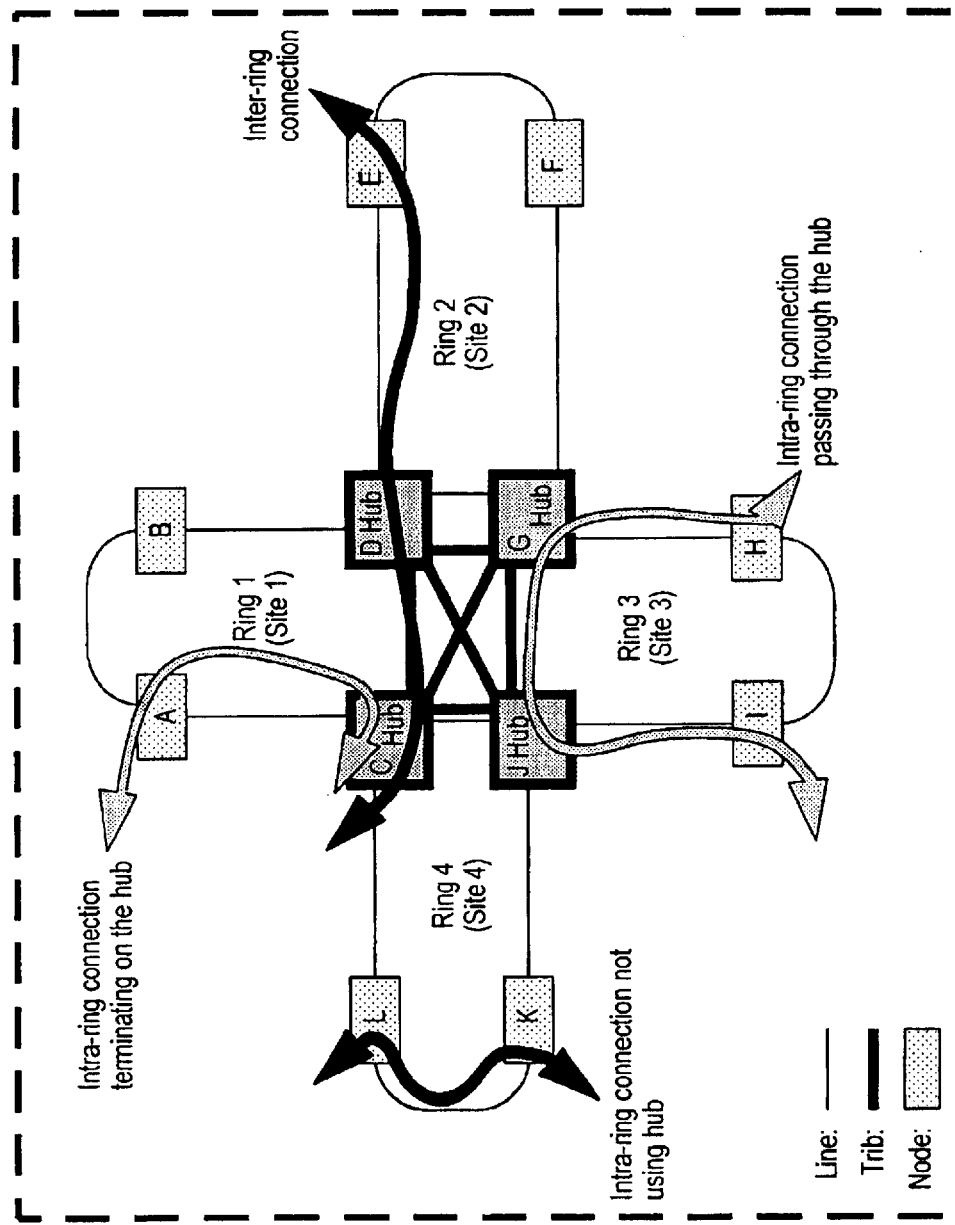
FIG. 4 shows a DX hub with back-to-back tributary connections.

In FIG. 4 a DX (digital cross-connect) hub with back-to-back tributary connections is illustrated. FIG. 4 shows four rings (Ring 1, Ring 2, Ring 3, and Ring 4) which are interconnected via four network elements (NEs) C,D,J, and G which form a hub. Ring 1 thus comprises NEs A, B, C, D; ring 2 comprises NEs D, E, F, G; ring 3 comprises NEs G, H, I, J; and ring 4 comprises NEs J, K, L, C. For example, the hub, C, D, J, G nodes may form an STS-192 (or STM-64) BLSR (bi-directional line switched ring).

Each of the hub NEs C, D, J, and G is able to directly connect with the other three hub NEs.

FIG. 4 shows the following types of possible connections:

inter-ring connection terminating on the hub;

inter-ring connection;

intra-ring connection passing through the hub; and intra-ring connection not using the hub.

A customer specific trail routing policy may comprise:

within a hub, a back-to-back (B2B) tributary should not be used to route trails unless the trail being created terminates on that site;

trails within neighbouring rings/sites should traverse the B2B physical links; and trails between non-neighbouring rings/sites should traverse the central hub.

The term "link" here refers to a logical grouping of all the connections between two neighbouring subnetworks are of the same directionality (i.e. either unidirectional one way, or unidirectional another way, or bi-directional), and which reside at the same layer and utilise the same immediate server layer network trails.

The above routing policy is supported as follows according to a first embodiment of the invention:

Firstly, to ensure that a B2B tributary should not be used for trails terminating within a hub, a user can set a value in the link usage threshold level to determine if the link cost should be adjusted or not. If a comparatively high cost is assigned to a B2B physical link this ensures that when a trail is computed, the computed cost of a trail using a B2B physical link will be high, ensuring that such trails are not selected by any computational algorithm as providing optimum routing unless no alternative routes exist. (This does not affect the ability of a user overriding any computed routes manually.)

Secondly, to ensure that that trails within neighbouring rings/sites traverse the B2B physical links, the exclusion profile can be selected to specify that link along the DX nodes are excluded whenever creating such trails.

Thirdly, to ensure that trails between non-neighbouring rings/sites should traverse the central hub, comparatively low costs can be assigned to the hub physical links relative to the B2B physical links.

Link Usage Threshold Level Calculation

An embodiment of the invention in which link usage threshold levels are calculated will now be described with reference to the accompanying drawings.

Consider the process of creating of a trail within a server layer network, i.e. the layer of the network which provides service(s) to the layer immediately above (the client layer), via one or more access points. For example, the VC-4 path layer acts as a server layer for the VC-3 LO path and the VC-12 path client layers.

Entities in the client and the immediate server layer are associated by a link in the client layer network being provided by a trail in the immediate server layer network. For example, a VC-3 link is provided by a trail in the VC-4 path layer network.

When a server layer network trail is created, links are created for each type of client layer trail which may use the server layer network trail. Thus when an STS-1 path layer network trail is created, links are created for a VT1.5 path layer trail (assuming this is supported, for example by the provision of a DS1 card or its equivalent within an NE).

The links created monitor the usage of bandwidth in the immediate server layer network trail from the client layer's perspective. As an example, an STS-1 path layer trail created via an OC-3 interface circuit (via an STS-3 rate) will result in one slot being allocated in the three STS-1 path layer link, but in 28 slots in the client layer VT1.5 path layer link.

Examples for various link usage threshold level for various client layers are given below:

In SONET:
VT1.5 client layer on STS-1 pipe=$\frac{1}{28}$*100%=3.57%
STS1 client layer on Line-OC3=$\frac{1}{3}$*100%=33.33%
STS1 client layer on Line-OC12=$\frac{1}{12}$*100%=8.33%

In SDH
VC12 client layer on VC4 pipe=$\frac{1}{63}$*100%=1.53%
VC3 client layer on VC4 pipe=$\frac{1}{3}$*100%=33.33%
VC4 client layer on MS-STM4 is $\frac{1}{4}$*100%=25%

According to another embodiment of the invention, the original link cost is adjusted using a Fibonacci sequence of numbers, depending on the percentage rates of link usage threshold level.

TABLE 1

Cost Adjustment Numbers a 1% link usage threshold.

| Link Usage Threshhold Level Range | Values Added to Original Link Cost |
| --- | --- |
| 1–9% | 2 |
| 10–19% | 3 |
| 20–29% | 5 |
| 30–39% | 8 |
| 40–49% | 13 |
| 50–59% | 21 |
| 60–69% | 34 |
| 70–79% | 55 |
| 80–89% | 89 |
| 90–99% | 144 |

Figure 5:
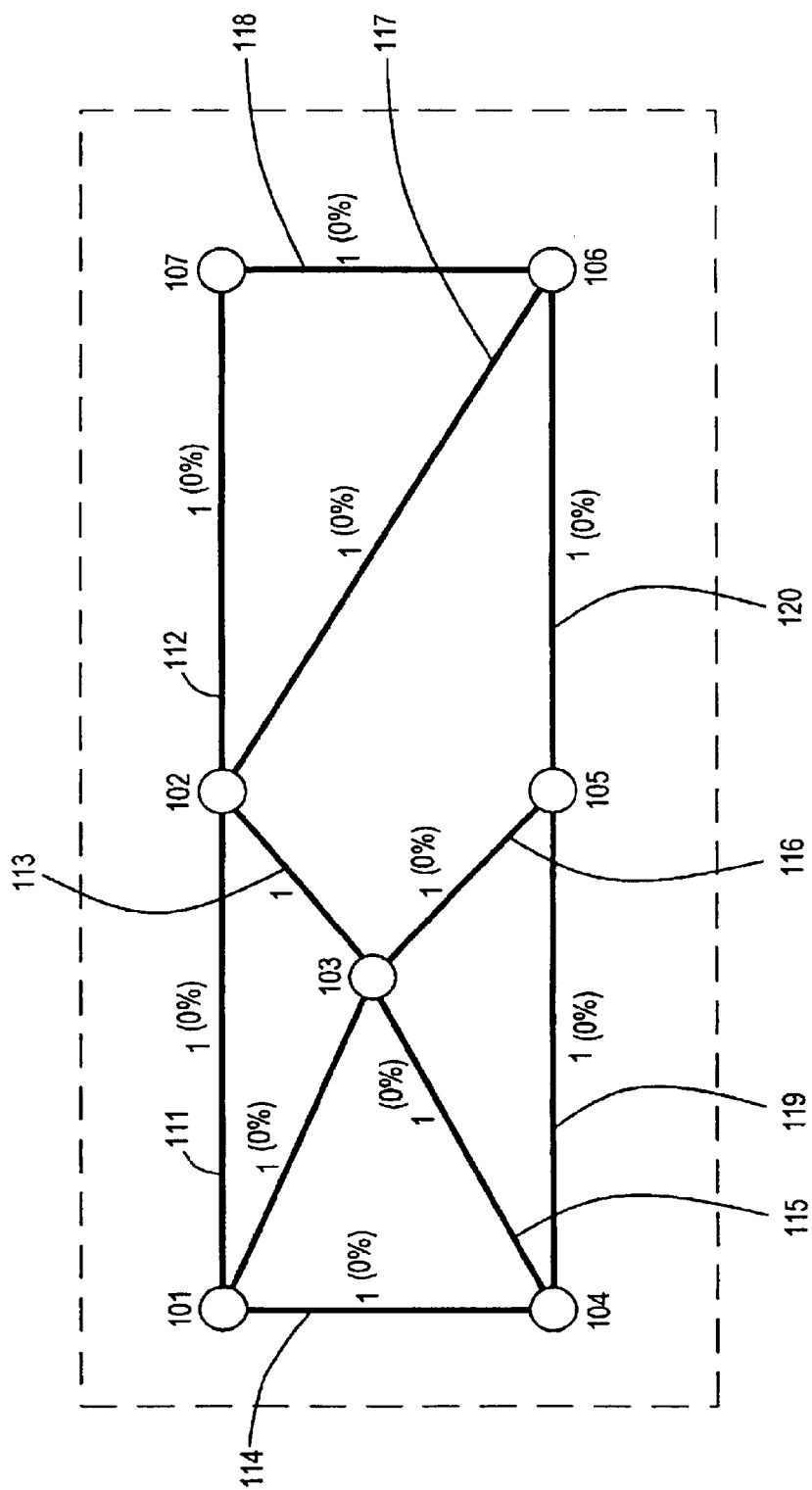
FIG. 5 shows the load distribution of traffic across an arrangement of network nodes connected to form part of a network according to a first embodiment of the invention.

The fact that the link usage level has been set to 40% does not affect the network graph shown in FIG. 5, nor the associated initial costs or the routing algorithm.

Thus if a user specifies the link usage threshold as 40% in the policy profile, the route advisor application will adjust the original cost as follows:

TABLE 2

Example of a User specified Link Usage Level and resulting Cost Adjustment Numbers

| Link Usage Threshhold Level Range | Values Added to Original Link Cost |
| --- | --- |
| 40–49% | 2 |
| 50–59% | 3 |
| 60–69% | 5 |

TABLE 2-continued

Example of a User specified Link Usage Level and resulting Cost Adjustment Numbers

| Link Usage Threshhold Level Range | Values Added to Original Link Cost |
| --- | --- |
| 70–79% | 8 |
| 80–89% | 13 |
| 90–99% | 21 |

Referring now to FIG. 5 of the accompanying drawings, a mesh network 100 is shown having number of nodes 101–7 (for example switches etc) which are shown connected together by links 111–120. Each link 111–120 has a cost associated with it, which must not be non-negative. The link usage level for each link is indicated in brackets (%).

Figure 6:
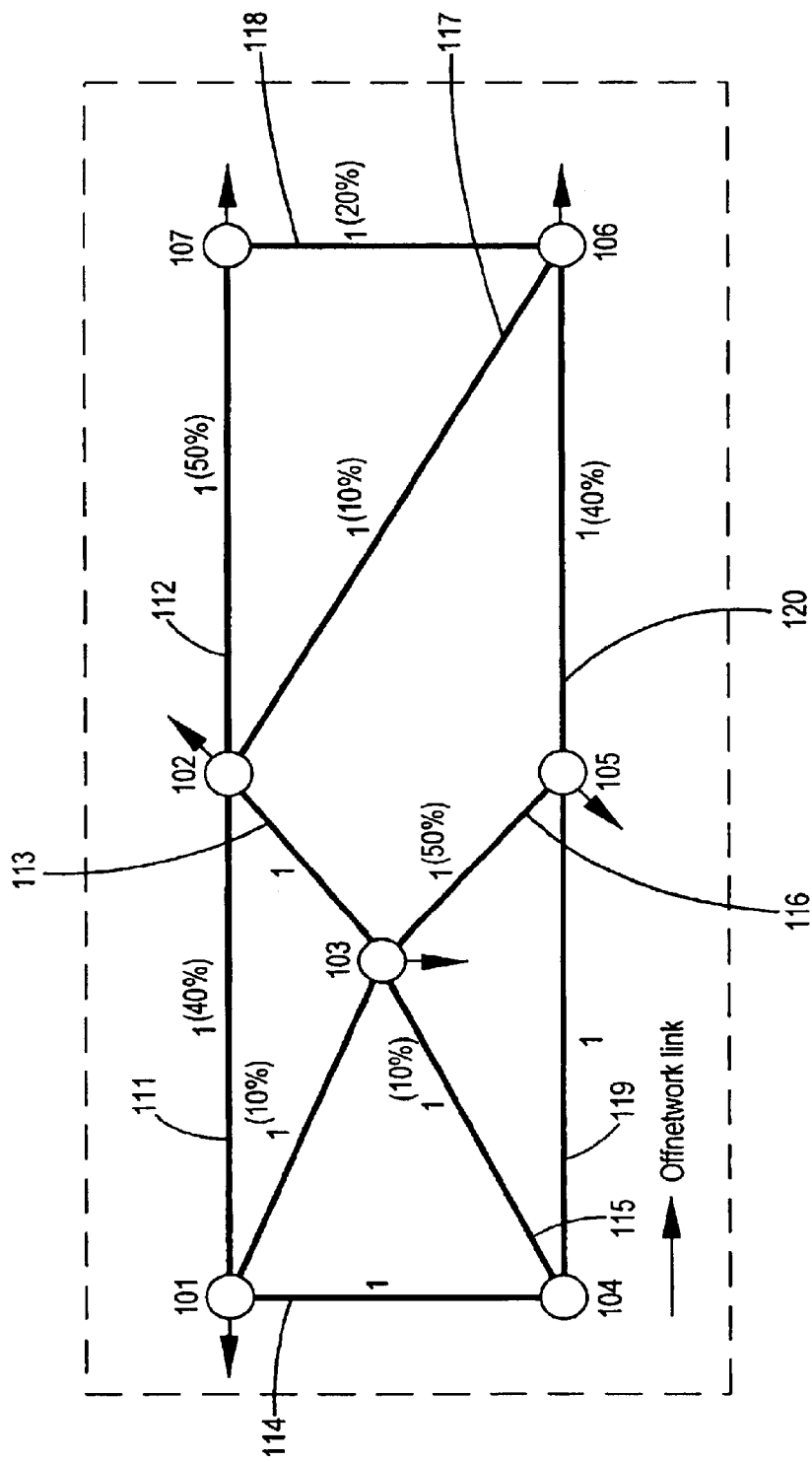
FIG. 6 shows a weight distribution applied to the arrangement of network nodes shown in FIG. 1.

Given the problem of determining the shortest path from 101 to 107, a conventional algorithm may select links 111 and 112. This algorithm would incur a cost of two units according to the scenario shown in FIG. 5. FIG. 6 shows an alternative scenario in which link 111 has a utilization level of 40%, link 112 has a utilization level of 50%, link 116 has a utilization level of 40%, link 120 has a utilization level of 40% and link 118 has a utilization level of 20%. In this embodiment of the invention, the cost adjustment numbers provided in table 2 are then added to the cost of the links resulting in the scenario shown in FIG. 7.

Figure 7:
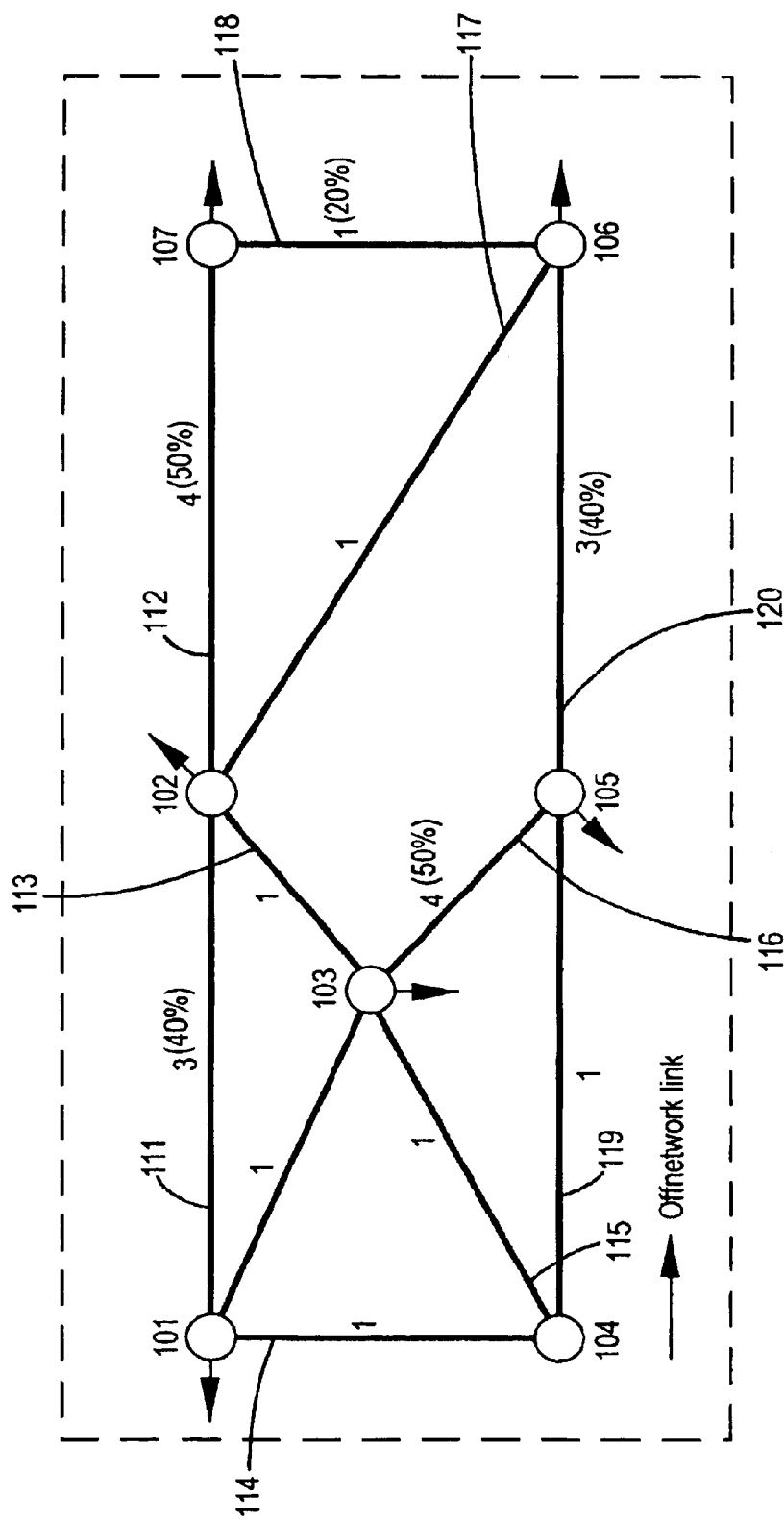
FIG. 7 shows a weight distribution applied to the arrangement of network nodes shown in FIG. 1 in which a cumulative path threshold value has been applied.

Implementing the routing algorithm for the scenario shown in FIG. 7, the problem of finding the shortest path from node 101 to 107 would result in the cheapest path being computed as 101-103-102-106-107, having a cost of 4. Thus, by determining a link usage level which adjusts the link costs, it is possible to select proposed routes which differ drastically from the route which would be generated without any such adjustment.

Advantageously therefore, by considering the link usage threshold value and using this to modify the original cost of a link prior to running a routing algorithm, there is no need to provide a complex genetic code algorithm to take into account various user requirements of this nature.

The invention provides biased input to a cost-based routing algorithm which enables such an algorithm to generate routes which are more responsive to the users requirements. This and other modifications to the input results in several advantages.

For example, in another embodiment of the invention, it is possible to take into account scenarios such as when two separate links exist between two adjacent nodes by, for example, performing a reciprocal operation on all link usage threshold levels and applying the resultant adjusted value to the cost.

Another embodiment of the invention considers the cumulative path threshold level, i.e., the number of hops in the path calculated so far. For example, if the cumulative path threshold level is set to three, the least cost route should not be more than 3 hops. Given the scenario shown in FIG. 7, and the problem of determining the shortest route from node 111 to node 107, this time the cheapest route is via nodes 101-103-102-107, i.e., three hops, and has a least cost of 6. This is not the optimum cost which the network scenario shown in FIG. 4 supports (which was the value 4), but as a result of cumulative path threshold level constraints, this is the optimum cost given the least cost route should not involve more than 3 hops.

Advantageously, by specifying a cumulative path threshold, less equipment is used and the total number of cross-connects is reduced in a trail. Reducing the number of hops in a trail decreases the likelihood of failure within the trail, and decreases the signal-to-noise ratio etc. Constraining the cumulative path is also advantageous in that the circuit routing to be matched to the network planning recommendation, which enables Network Operators to meet their service level agreement commitments.

Many other modifications on improvements can be made to the above embodiments which the skilled man will appreciate are included within the spirit and scope of the invention. The scope of the invention is thus defined by the accompanying claims, with reference to the accompanying drawings and descriptions where appropriate.

For example, a Dijkstra route computing engine considers each link separately, and only once the links have been determined are any connection rules provided by the trail adviser consulted to ensure that the route computed is satisfactory, for example, that any optical constraints are complied with by the route. Other embodiments of the invention bias output by influencing the Dijkstra algorithms with parameters reflecting the cost of each link and its capacity. As capacity may change, this is a useful technique to ensure that when protection is to be provided, it is provided between adjacent nodes which have high levels of capacity, i.e. high availability, rather than via other routes if the availability along the other routes between the two nodes is low.

Figure 8:
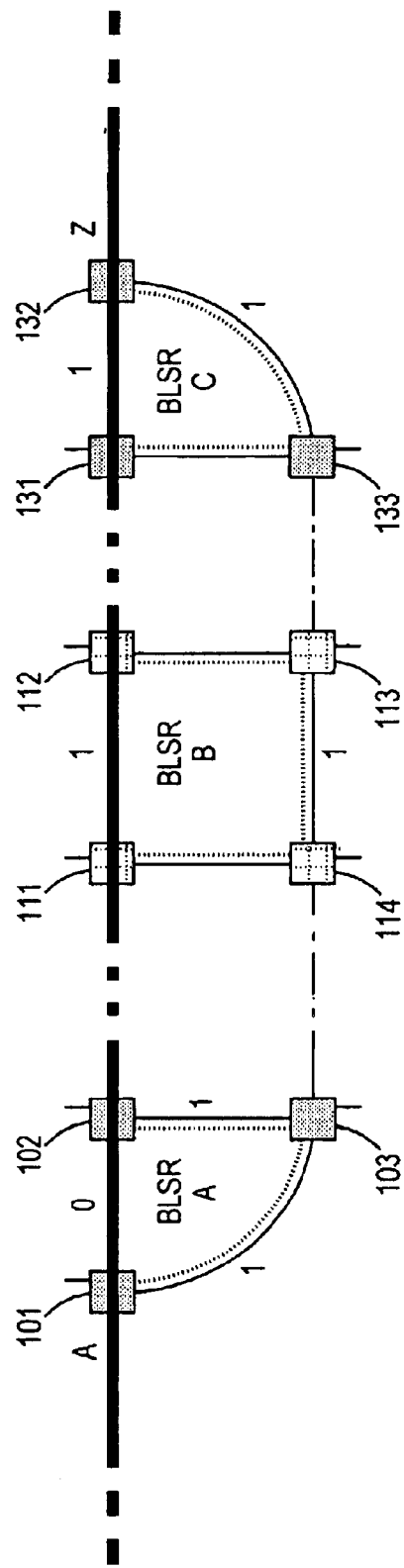
FIG. 8 shows an second embodiment of the invention, in which the cost of links are biased to ensure available links with high levels of capacity are selected when determining protection routes.

FIG. 8, for example, shows another embodiment of the invention in which a the output from a Dijkstra routing engine can be influenced by providing biased input to artificially induce a more desirable route selection by the routing engine. In FIG. 8, consider the case where protection is required for a working path A to Z. Whilst the protection path selected should ideally be configured at the lowest "cost" and a Dijkstra routing engine will normally seek to return the Yen-K shortest path, this may cause protection paths to be returned which include congested links, leaving alternative routes following less congested links unselected.

This is particularly possible if the working path A to Z for which protection is to be provided intersects one or more bi-directional line switched rings (BLSRs). In FIG. 8 working path A to Z encounters three BLSRs A, B, B. The first BLSR A comprises three nodes 101, 102, 103 connected to a second BLSR B comprising four nodes 111, 112, 113, 114, connected in turn to a third BLSR C comprising three nodes 131, 132, 133. If a connection is broken between BLSRs B and C for example, then diverse path protection could conventionally be provided by the trail advisor selecting either a route from nodes 101 to 103 via 102 or a direct route 101 to 103. The cost of links is biased to reflect the available capacity for traffic. Thus a link which has a high capacity available is given a low cost, for example, zero cost, whereas the cost of link which has relatively low capacity available is given a higher cost, for example, a cost of 1.

The invention can therefore be used to bias the Dijkstra algorithm to ensure that the protection route selected re-uses any links between nodes which have high availability.

For the removal of doubt, a summary of the following definitions are used to describe various features of the invention are recited below:

Client Layer:

A client layer utilises the service(s) provided by the server layer immediately beneath it through one or more access points. The association between entities in the client and the immediate server layer is one where a link in the client layer network is provided by a trail in the immediate server layer network. For example, a VC-3 link is provided by a trail in the VC-4 path layer network.

Working Trail Value:

The computed trail value of a client layer trail is the sum of the quality of service (QoS) parameters of the trails in the immediate server layer network which it uses for the working path.

Dialog

A separate UI entity which can be opened and closed. A dialog is composed of one or more sections, and has no menu bar.

Diverse Trail:

A trail whose working and, if present, protecting paths are fully topologically diverse to one or more specified existing trails with respect to their routing in the immediate server layer network. The working and, if present, protecting paths may be either partially or fully topologically diverse to one another as specified by the user when the protected trail is routed.

Full Diversity:

For a protected trail, if the working and protected paths have no immediate server layer network trails and/or nodes in common besides any nodes which terminate either end of the trail, then the working and protecting paths are said to be fully topologically diverse within the immediate server layer network.

Group/Hub:

A collection of NEs in a site. A site with multiple NEs.

Link:

A logical grouping of all the link connections between two neighbouring subnetworks with are of the same directionality (i.e. either unidirectional one way, or unidirectional another way, or bi-directional), and which reside at the same layer and utilise the same immediate server layer network trails.

Off-Network:

Off-Network reside on the periphery of a management domain and reside within the payload of a SONET/SDH port. Off-Network are pseudo trail termination points (TTPs), where the real TTP which terminates the trail either resides within another management domain, or in the same management domain but only after the trail has been routed through one or more other management domains.

Link Diversity:

For a protected trail, if link diversity is specified, no "link" will be used in both the working and protecting paths. Nodes may be reused.

Partial Diversity:

For a protected trail, if the working and protecting paths have one or more immediate server layer network trails and/or nodes in common besides any nodes which terminate either end of the trail, then the working and protecting paths are said to be partially topologically diverse within the immediate server layer network. Where the working and protecting paths share an immediate serer layer network trail, when possible, protection will be closed within the immediate server layer network before the shared trail is used.

Protected Trail:

A trail which has both working and protecting paths. The working and protecting paths will have the same TTPs and may or may not exploit protection mechanisms inherent In the underlying server layers.

Section:

an integral component of a dialog/window, and specific to a particular category of information which needs to be input by, and/or output to, the user. A section may in turn be composed of a number of sections. When a section is enables, all (in) directly contained buttons/fields/scrolling lists will be enables unless explicitly stated otherwise in the texts. When a section is disabled, all (in directly contained buttons/fields/scrolling lists will be disabled, but the user will otherwise be able to view all (in)directly contained fields/scrolling lists.

Server Layer:

A server layer provides service(s) to its client layer(s) through one or more access points. For example, the VC-4 path layer acts as a server layer for the VC-3 LO path and the VC-12 path layers.

Site:

A collection of Hubs and/or NEs.

Trail:

An end-to-end connection between TTPs across an arbitrary collection of nodes, and which may consist of multiple subnetwork connections and link connections.

Trail Termination Point (TTP):

A trail is delimited by TTs which may either reside in the same, or different, management domains. In the latter case, the trail ends and exits the management domain at an Off-Network.

Window:

A separate UI entity which can be opened and closed. A window is composed of one or more sections, and has a menu bar.

The term application is used herein to refer to a programme for a computer which may be provided in a form comprising software and/or hardware and/or, a signal provided in a form suitable for downloading onto a computer, as would be apparent to those skilled in the art from the context of the term. In particular, for example to a network management application.

The term apparatus is issued herein to refer to suitable hardware equipment and/or software supported by hardware equipment for example to a network element and/or a network management server as would be apparent to those skilled in the art from the context of the term.

Any range or device value given herein may be extended or altered without losing the effect sought, as will be apparent to the skilled person for an understanding of the teachings herein.

The text of the abstract repeated below is hereby incorporated into the description:

A method of selecting a trail using a Constraint based routing technique in which at least one user-determined routing policy is used to bias input to a Dijkstra/Yen-K shortest path routing engine, so as to limit output by the routine engine to routes conforming with the user-determined routing policy.

What is claimed is:

1. A method of selecting a trail route across a communications network using a routing engine, the method comprising the steps of:

selecting a routing policy profile having at least one route biasing parameter;

inputting information from said routing policy profile to said routing engine, in which said information includes information derived from said selected at least one route biasing parameter which biases the computation of trail routes; and computing a set of potential trail routes containing at least one potential trail route whose selection has been biased in accordance with said selected routing policy.

2. A method as claimed in claim 1, wherein the method is used to select trail routes for different classes of traffic within a network, and wherein the routing policy biases the output of the routing engine independently of the manner in which said different classes of traffic are individually routed.

3. A method as claimed in claim 1, wherein the step of selecting a routing policy profile is performed by a user of the communications network.

4. A method as claimed in claim 1, wherein the step of selecting a routing policy profile is performed by a network operator of the communications network.

5. A method as claimed in claim 1, wherein the step of selecting a routing policy profile is performed automatically by a network operator of the communications network.

6. A method as claimed in claim 1, wherein at least one of said parameters is taken from the group consisting of:

a balancing mode criteria; a threshold level for link usage criteria; a cumulative path threshold level criteria; a diverse routing criteria; an exclusion profile criteria for excluding some network sector/traffic type; a Quality of Service criteria; a Class of Service criteria; and a User Information criteria.

7. A method as claimed in claim 1, wherein the routing engine comprises a Dijkstra algorithm.

8. A method as claimed in claim 1, wherein the trail route selected provides protection for a working path.

9. A method as claimed in claim 1, wherein the trail route selected provides protection for a working path, and wherein the trail route selected re-uses at least one link along the working path having a higher capacity than any other available link.

10. A routing application having a graphically displayed user interface arranged to enable the selection of a trail route across a communications network using a routing engine, the software comprising:

selection means for a network operator of a communications network to select a routing policy profile having a plurality of parameters;

input means to input information from said routing policy profile to said routing engine to bias the computation of trail routes; and computational means to compute a set of potential trail routes containing at least one potential trail route whose selection has been biased in accordance with said selected routing policy.

11. A constraint based routing scheme for a communications network, the scheme comprising a method of selecting a trail route across a communications network using a routing engine, the method comprising the steps of:

selecting a routing policy profile having a plurality of route constraining parameters which are capable of constraining the output of said routing engine;

inputting information from said routing policy profile to said routing engine, wherein said inputted information includes said route constraining parameters to bias the computation of trail routes; and computing a set of potential trail mutes containing at least one potential trail route whose selection has been biased in accordance with said selected routing policy information by the inputted route constraining parameters.

12. Apparatus arranged to implement a method of selecting a trail route across a communications network using a routing engine, the apparatus comprising:

selection means arranged to enable a network operator to select a routing policy profile having a plurality of parameters;

input means arranged to input information from said routing policy profile to said routing engine to bias the computation of trail routes; and computational means arranged to compute a set of potential trail routes containing at least one potential trail route whose selection has been biased in accordance with said selected routing policy.

13. A route advising application providing routing policy management which can be selectively based on one or more routing policies, the routing policies having route biasing parameters which bias input into a Dijkstra based routing engine to constrain the number of routes output by the Dijkstra based routing engine to a set of at least one route which conforms with said routing policy.

14. A route advising application as claimed in claim 13, wherein the said one or more routing profiles may be based on at least one criteria taken from the group consisting of:

a balancing mode criteria for balancing traffic across the network, a threshold level for link usage criteria, a cumulative path threshold level criteria, a diverse routing criteria, an exclusion profile criteria for excluding some network sector/traffic type, a Quality of Service criteria, a Class of Service criteria, and/or a User Information criteria.

15. A routing scheme for a network comprising:

applying a biasing factor to a network link in a network topology model;

providing input from said biased network topology model to a routing algorithm;

selecting a route from a subset of at least one potential routes generated by said routing algorithm.

16. A routing scheme as claimed in claim 15, wherein said biasing factor is a weight given to said network link to prejudice said routing algorithm from selecting said network link.

17. A routing scheme as claimed in claim 16, wherein more than one network link is biased.

* * * * *